United States Patent
Kawaguchi et al.

(10) Patent No.: US 7,352,152 B2
(45) Date of Patent: Apr. 1, 2008

(54) PORTABLE ELECTRONIC APPLIANCE WITH A BATTERY HAVING A WIRELESS TAG CONTAINING BATTERY INFORMATION

(75) Inventors: Ryuji Kawaguchi, Asaka (JP); Masakatsu Kubota, Asaka (JP); Atsuhiko Ishihara, Asaka (JP); Seiji Kawasumi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 385 days.

(21) Appl. No.: 10/814,157

(22) Filed: Apr. 1, 2004

(65) Prior Publication Data
US 2004/0196006 A1    Oct. 7, 2004

(30) Foreign Application Priority Data

| Apr. 4, 2003 | (JP) | 2003-101121 |
| Apr. 4, 2003 | (JP) | 2003-101122 |
| May 21, 2003 | (JP) | 2003-143571 |

(51) Int. Cl.
*H01M 10/46* (2006.01)
(52) U.S. Cl. .................................................. 320/106
(58) Field of Classification Search ............... 320/106, 320/110, 114, 115
See application file for complete search history.

(56) References Cited

U.S. PATENT DOCUMENTS

| 5,635,813 A | 6/1997 | Shiga et al. | |
| 5,990,659 A * | 11/1999 | Frannhagen | 320/106 |
| 6,005,367 A * | 12/1999 | Rohde | 320/106 |
| 6,020,082 A * | 2/2000 | Orlando | 429/7 |
| 6,175,211 B1 * | 1/2001 | Brotto | 320/106 |

FOREIGN PATENT DOCUMENTS

| CN | 1360270 A | 11/2001 |
| JP | 2-294231 | 12/1990 |
| JP | 5-135804 A | 6/1993 |
| JP | 2000-022578 A | 1/2000 |
| JP | 2001-222991 A | 8/2001 |

* cited by examiner

*Primary Examiner*—Edward H Tso
(74) *Attorney, Agent, or Firm*—Birch, Stewart, Kolasch & Birch, LLP

(57) ABSTRACT

An electronic appliance has a data read/write section which reads information about a battery stored in a wireless tag provided in the battery, and a CPU which recognizes the read information about the battery and generates battery remaining energy warning information to be displayed on a display section according to the battery information. The battery remaining energy warning information according to the kind of the battery, the name of the manufacturer of the battery, etc., is generated and displayed to correctly and effectively inform a user of a remaining energy warning about the battery presently used.

14 Claims, 8 Drawing Sheets

|  | BATTERY USE RATE (%) | |
|---|---|---|
|  | ALKALINE BATTERY | NICKEL METAL HYDRIDE BATTERY |
| PRE-END VOLTAGE 2.2V | 65% | 96% |
| END VOLTAGE 2.0V | 100% | 100% |

EXAMPLE OF WARNING DISPLAY

① NORMAL USED STATE

② SIGN AFTER DETECTION OF PRE-END VOLTAGE

③ SIGN AFTER DETECTION OF END VOLTAGE

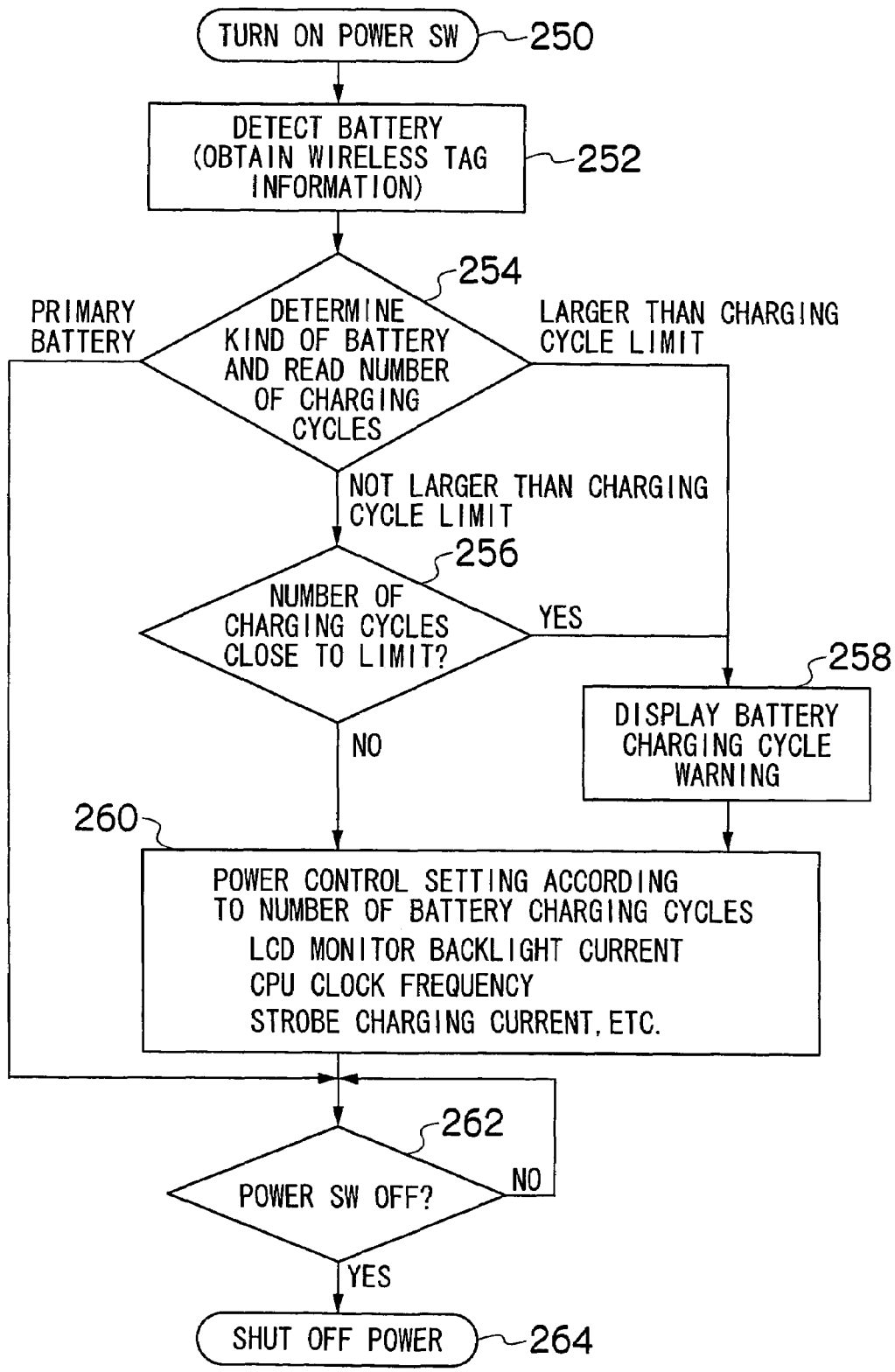

FIG.10A

NUMBER OF BATTERY CHARGING CYCLES
IS CLOSE TO LIMIT.

PREPARE NEW BATTERY

FIG.10B

NUMBER OF BATTERY CHARGING CYCLES
IS EXCEEDING LIMIT.

REPLACE BATTERY WITH NEW ONE RIGHT NOW

PORTABLE ELECTRONIC APPLIANCE WITH A BATTERY HAVING A WIRELESS TAG CONTAINING BATTERY INFORMATION

This Nonprovisional application claims priority under 35 U.S.C. § 119(a) on Patent Application No(s). 2003-101121; 2003-101122 and 2003-143571 filed in JAPAN on Apr. 4, 2003; Apr. 4, 2003 and May 21, 2003, the entire contents of which are hereby incorporated by reference.

BACKGROUND OF THE INVENTION

1. Field of the Invention

The present invention relates to a portable electronic appliance and a battery and, more particularly, to a portable electronic appliance capable of using a battery as a power source and a battery capable of being used as a power source.

2. Description of the Related Art

Many of portable electronic appliances such as digital cameras are capable of operating on a detachable battery for their portability and use AA batteries which are immediately available. AA batteries include many kinds, e.g., manganese batteries, alkaline batteries and lithium batteries formed as primary batteries, and nickel-cadmium batteries and nickel metal hydride batteries formed as secondary batteries.

All these AA batteries are identical in shape to each other. Therefore, it is difficult, for example, for a digital camera using an AA battery as a power source to identify the kind of battery when the battery used therein is changed. In an electronic product, a battery remaining voltage at which a remaining battery energy warning sign should be displayed is set as a value suitable for the kind of a battery packaged with the product when the product is sold. If a different kind of battery is used, the remaining battery energy warning sign according to the characteristics of the battery cannot be provided. For example, on a portable electronic appliance product with which an alkaline battery is packaged, a remaining energy warning sign matching the characteristics of the battery is set. If a nickel metal hydride battery is used in the portable electronic appliance, there is a possibility of the electronic appliance becoming unable to perform photography immediately after the remaining energy warning sign has been displayed due to the difference between the characteristics of the batteries.

Batteries produced by different manufacturers vary in capacity even if they are of the same kind and equal in size. Therefore, there is a possibility of batteries differing in life even from the same remaining voltage.

On the other hand, a scheme has recently been started to establish a system in which a product is provided with a wireless tag containing information on the product and the information in the wireless tag is read with a reader to be used for product management or the like.

Japanese Patent Application Publication No. 2000-22578 discloses a proposition relating to an ID card for input/output management using a wireless tag and to a stock management system. Japanese Patent Application Publication No. 5-135804 discloses means for discriminating secondary battery packs. However, either or the arts disclosed in these publications is not a solution of the above-described problem.

In a case where a power control setting according to the kind of a battery is stored in an appliance, troublesome operations are required such that it is necessary for a user to check the kind of battery and to make a power control setting each time the battery is changed.

In some case of use of a secondary battery in a portable electronic appliance, the portable electronic appliance itself has the function of charging the secondary battery. Even in such a case, however, the portable electronic appliance is incapable of discriminating a battery charged not so many times and a battery charged several hundred times from each other since it has no means for accurately determining the number of times the secondary battery is charged, and a user must keep in memory the number of times the battery is charged.

Therefore, in a case where a secondary battery for a portable electronic appliance is used a number of times closer to a number of times considered a battery performance limit such that the battery degrades in characteristics, there is a possibility of the degraded condition of the battery being mistaken as degradation in performance and failure of the portable electronic appliance.

SUMMARY OF THE INVENTION

In view of the above-described circumstances, and in the expectation that batteries would also be provided in future with wireless tags containing information about the batteries, an object of the present invention is to provide a portable electronic appliance capable of displaying a battery remaining energy warning sign matching characteristics of a battery by using a wireless tag on the batter even if the battery is any of usable batteries identical in size but varying in kind and produced by different manufacturers.

Another object of the present invention is to provide a battery provided with a wireless tag containing information about the battery and easily detectable with efficiency by the appliance in which the battery is used.

In the expectation that batteries would also be provided in future with wireless tags containing information about the batteries, still another object of the present invention is to provide a portable electronic appliance capable of automatically performing power control matching characteristics of a battery by using a wireless tag on the battery even if the battery is any of usable batteries identical in size but varying in kind and produced by different manufacturers.

In the expectation that batteries would also be provided in future with wireless tags containing information about the batteries, a further object of the present invention is to provide a portable electronic appliance capable of accurately determining, by using a wireless tag on a secondary battery, the number of times the secondary battery is charged, enabling a user to recognize a degraded state of the secondary battery, and preventing the secondary battery from immediately becoming unusable due to degradation during use.

In a first aspect of the present invention, there is provided a portable electronic appliance capable of using a battery as a power source, the appliance having a reading device which reads information about the battery stored in a wireless tag provided on the battery, a recognition device which recognizes the information about the battery read by the reading device, a warning display device which displays a battery remaining energy warning, and a warning generation device which generates battery remaining energy warning information according to the information recognized by the recognition device, and sends the generated information to the warning display device.

According to the first aspect of the present invention, the reading device reads the information about the battery stored in the wireless tag. The wireless tag is provided on the battery, for example, by being embedded in the battery or adhered to the battery. The recognition device recognizes the information about the battery read by the reading device. The information about the battery includes information indicating kinds of batteries such as a primary battery and a secondary battery, the name of the manufacturer of the battery, and the capacity of the battery. The warning generation device generates a battery remaining energy warning information according to the information recognized by the recognition device, and sends the generated remaining energy warning information to the warning display device. The battery may vary in discharging characteristics, for example, depending on whether it is a primary battery or a secondary battery, and may vary in capacity among manufacturers. Therefore, if battery remaining energy warning information can be generated according to the kind of the battery, the name of the manufacturer of the battery, the capacity of the battery and so on, a remaining energy warning for the presently used battery can be displayed correctly and effectively.

In a second aspect of the present invention, there is provided a portable electronic appliance capable of using a battery as a power source, the appliance having a reading device which reads information stored in a wireless tag provided on the battery, and which is provided approximately at a center in the lengthwise direction of a lengthwise-extending place for accommodation of the battery.

According to the second aspect of the present invention, the reading device is provided approximately at a center in the lengthwise direction of a lengthwise-extending place for accommodation of the battery. Therefore, even in a case where a plurality of the batteries are accommodated in the accommodation place in a state of being alternately oriented along their lengthwise direction, reading from the wireless tags can be performed without providing a plurality of reading devices if the wireless tag is provided on each battery approximately at a center in the lengthwise direction.

In a third aspect of the present invention, there is provided a battery having a lengthwise-extending shape, the battery having a wireless tag attached to a portion of the battery approximately at a center in the lengthwise direction of the battery.

In a fourth aspect of the present invention, there is provided a battery having a lengthwise-extending shape, the battery having a wireless tag in the form of a band attached to a portion of the battery approximately at a center in the lengthwise direction of the battery so as to extend in the circumferential direction.

As the battery in the third and fourth aspects, an AA battery can be used.

In a fifth aspect of the present invention, there is provided a battery having a lengthwise-extending shape, the battery having a wireless tag attached to a portion of the battery approximately at a center in the lengthwise direction of the battery, the battery being used in the portable electronic appliance in the second aspect of the present invention.

If the battery in the fifth aspect of the present invention is used, the portable electronic appliance in the second aspect of the present invention can reliably detect with the reading device the wireless tag provided on the battery and can read with the reading device the information stored in the wireless tag.

In the sixth aspect of the present invention, there is provided a portable electronic appliance capable of using a battery as a power source, the appliance having a reading device which reads information about the battery stored in a wireless tag attached to the battery, a recognition device which recognizes the information about the battery read by the reading device, a power control device which controls the amount of power consumed by the portable electronic appliance, and a control command generation device which sends to the power control device a power control command according to the information recognized by the recognition device.

According to the sixth aspect of the present invention, the reading device reads the information about the battery stored in the wireless tag. The wireless tag is attached to the battery, for example, by being embedded in the battery or adhered to the battery. The recognition device recognizes the information about the battery read by the reading device. The information about the battery includes information indicating kinds of batteries such as a primary battery and a secondary battery, and the name of the manufacturer of the battery. The control command generation device sends to the power control device a power control command according to the information recognized by the recognition device. The battery may vary in discharging characteristics, for example, depending on whether it is a primary battery or a secondary battery, and may vary in capacity among manufacturers. Therefore, if a power control command according to the kind of battery, the name of the manufacturer, and so on is generated and sent to the power control device, the amount of power consumed by the portable electronic appliance can be controlled by considering the characteristics of the battery presently used.

In a seventh aspect of the present invention, there is provided a portable electronic appliance capable of using a battery as a power source, the appliance having a reading device which reads information about the battery stored in a wireless tag attached to the battery, a recognition device which recognizes the information about the battery read by the reading device, a power control device which controls the amount of power consumed by the portable electronic appliance so that the amount of power is reduced, and a control command generation device which sends to the power control device a command to perform such control that the amount of power is reduced according to the information recognized by the recognition device.

According to the seventh aspect of the present invention, the reading device reads the information about the battery stored in the wireless tag. The wireless tag is attached to the battery, for example, by being embedded in the battery or adhered to the battery. The recognition device recognizes the information about the battery read by the reading device. The information about the battery includes information indicating kinds of batteries such as a primary battery and a secondary battery, and the name of the manufacturer of the battery. The control command generation device sends to the power control device a power reduction control command according to the information recognized by the recognition device. The battery may vary in discharging characteristics, for example, depending on whether it is a primary battery or a secondary battery, and may vary in capacity among manufacturers. Therefore, if a power reduction control command according to the kind of battery, the name of the manufacturer, and so on is generated and sent to the power control device, the amount of power consumed by the portable electronic appliance can be controlled and reduced by considering the characteristics of the battery presently used.

In an eighth aspect of the present invention, there is provided a portable electronic appliance capable of using a battery as a power source, the appliance having a reading device which reads information stored in a wireless tag attached to the battery, the stored information including information for identification of the battery and the kind of the battery, a recognition device which recognizes the information read by the reading device, the read information including information for identification of the battery and the kind of the battery, a charging device which can charge the battery in a case where the battery in the portable electronic appliance is a secondary battery, a charging cycle storage device which stores the number of cycles of charging of the battery in the portable electronic appliance on the basis of the information for identification of the battery in a case where the battery in the portable electronic appliance is a secondary battery, a warning display device which displays a warning about use of the battery, and a warning generation device which makes the warning display device display information on a warning about use of the battery according to the number of charging cycles.

According to the eighth aspect of the present invention, the reading device reads the information stored in the wireless tag, the stored information including information for identification of the battery and the kind of the battery. The wireless tag is attached to the battery, for example, by being embedded in the battery or adhered to the battery. The recognition device recognizes the information read by the reading device, the read information including information for identification of the battery and the kind of the battery. The information for identification of the battery includes information through which the battery is identified, e.g., information as to whether the battery has ever been charged by this portable electronic appliance. The information including the kind of the battery is information including kinds of batteries such as a primary battery and a secondary battery and, in some case, any other sort of information such as the name of the manufacturer of the battery. The charging device can charge the battery if the battery in the portable electronic appliance is a secondary battery. The reading device and the recognition device enable ascertainment of whether or not the battery in the portable electronic appliance is a secondary battery. The charging cycle storage device stores the number of cycles of charging of the battery performed in the portable electronic appliance on the basis of the information for identification of the battery in the case where the battery is a secondary battery. The warning generation device makes the warning display device display information on a warning about use of the battery. In the case of a secondary battery, the capacity of the battery decreases and the usable time becomes shorter as the number of charging cycles is increased. In such a case, it is necessary to replace the battery with a new one. Therefore a warning information for urging a user to purchase a new battery is displayed.

In a ninth aspect of the present invention, there is provided a portable electronic appliance capable of using a battery as a power source, the appliance having a reading device which reads information stored in a wireless tag attached to the battery, the stored information including information for identification of the battery and the kind of the battery, a recognition device which recognizes the information read by the reading device, the read information including information for identification of the battery and the kind of the battery, a charging device which can charge the battery in a case where the battery in the portable electronic appliance is a secondary battery, a charging cycle storage device which stores the number of cycles of charging of the battery in the portable electronic appliance on the basis of the information for identification of the battery in a case where the battery in the portable electronic appliance is a secondary battery, a power control device which controls the amount of power consumed in the portable electronic appliance so that the amount of power is reduced, and a power reduction instruction device which instructs the power control device to reduce the amount of consumed power according to the number of charging cycles.

According to the ninth aspect of the present invention, the reading device reads the information stored in the wireless tag, the stored information including information for identification of the battery and the kind of the battery. The wireless tag is attached to the battery, for example, by being embedded in the battery or adhered to the battery. The recognition device recognizes the information read by the reading device, the read information including information for identification of the battery and the kind of the battery. The information for identification of the battery includes information through which the battery is identified, e.g., information as to whether the battery has ever been charged by this portable electronic appliance. The information including the kind of the battery is information including kinds of batteries such as a primary battery and a secondary battery and, in some case, any other sort of information such as the name of the manufacturer of the battery. The charging device can charge the battery if the battery in the portable electronic appliance is a secondary battery. The reading device and the recognition device enable ascertainment of whether or not the battery in the portable electronic appliance is a secondary battery. The charging cycle storage device stores the number of cycles of charging of the battery performed in the portable electronic appliance on the basis of the information for identification of the battery in the case where the battery is a secondary battery. The power reduction instruction device instructs the power control device to reduce the amount of consumed power according to the number of charging cycles. The power control device receives a power consumption reduction instruction from the power reduction instruction device and reduces the amount of power consumed by the portable electronic appliance. In the case of a secondary battery, the capacity of the battery decreases and the usable time becomes shorter as the number of charging cycles is increased. Therefore the power consumption is reduced to increase the time period during which the battery can be used.

In a tenth aspect of the present invention, there is provided a portable electronic appliance capable of using a battery as a power source, the appliance having a reading device which reads information stored in a wireless tag attached to the battery, the stored information including the kind of the battery and the number of cycles of charging of the battery, a recognition device which recognizes the information read by the reading device, the read information including the kind of the battery and the number of cycles of charging of the battery, a charging device which can charge the battery in a case where the battery in the portable electronic appliance is a secondary battery, a writing device which writes the number of charging cycles in the portable electronic appliance to the wireless tag, a warning display device which displays a warning about use of the battery, and a warning generation device which makes the warning display device display information on a warning about use of the battery according to the number of charging cycles.

According to the tenth aspect of the present invention, the reading device reads the information stored in the wireless tag, the stored information the kind of the battery and the number of cycles of charging of the battery. The wireless tag is attached to the battery, for example, by being embedded in the battery or adhered to the battery. The recognition device recognizes the information read by the reading device, the read information including the kind of the battery and the number of cycles of charging of the battery. The information on the kind of battery includes kinds of batteries such as a primary battery and a secondary battery. The information on the number of charging cycles is information on the number of times the battery has been charged. In some case, these sorts of information include any other sort of information such as the name of the manufacturer of the battery. The charging device can charge the battery if the battery in the portable electronic appliance is a secondary battery. The reading device and the recognition device enable ascertainment of whether or not the battery in the portable electronic appliance is a secondary battery. In the case of a secondary battery, the writing device writes to the wireless tag the number of times the battery has been charged in the portable electronic appliance. The warning generation device makes the warning display device display information on a warning about use of the battery according to the number of charging cycles. In the case of a secondary battery, the capacity of the battery decreases and the usable time becomes shorter as the number of charging cycles is increased. In such a case, a need arises to replace the battery with a new one. Therefore a warning information for urging a user to purchase a new battery is displayed.

According to the first aspect of the present invention, a remaining energy warning with respect to the battery presently used can be displayed correctly and effectively. Therefore a user can grasp the usable remaining amount of energy in the battery regardless of the kind of the battery, can use such a reliable guide for replacement of the battery and can readily prepare the next battery.

According to the second aspect of the present invention, the portable electronic appliance can be reduced in size as well as in cost.

According to the third aspect of the present invention, even in a case where a plurality of batteries are accommodated in the accommodation place of the appliance using the batteries in a state of being alternately oriented along their lengthwise direction, reading from the wireless tags can be performed without providing a plurality of reading devices.

According to the sixth aspect of the present invention, the amount of power consumed by the portable electronic appliance can be automatically controlled according to the characteristics of the battery presently used. Therefore, the time period during which the digital camera can be used does not change largely when the kind of battery is changed. Consequently, a user can use the electronic appliance without being concerned about the kind of battery.

According to the seventh aspect of the present invention, the amount of power consumed by the portable electronic appliance can be automatically controlled and reduced according to the characteristics of the battery presently used. Therefore, the time period during which the digital camera can be used does not change largely when the kind of battery is changed. Consequently, a user can use the electronic appliance without being concerned about the kind of battery.

According to the eighth aspect of the present invention, the number of cycles of charging of the battery in the portable electronic appliance is stored and the warning display device is made to display warning information about use of the battery according to the number of charging cycles. Therefore, when the number of charging cycles becomes closer to a battery performance limit, a warning can be displayed to urge a user to purchase a new battery. When the number of charging cycles exceeds the battery performance limit, the user can be urged to change the battery. The user can know the use limit of the battery without mistaking an operation fault of the battery for a malfunction of the portable electronic appliance.

According to the ninth aspect of the present invention, the number of cycles of charging of the battery in the portable electronic appliance is stored and the power consumption is reduced according to the number of charging cycles. Therefore, the battery operating time can be increased and the battery can be used for a while even after the user has forgotten to change the battery.

According to the tenth aspect of the present invention, the number of cycles of charging of the battery is stored in the wireless tag and the warning display device is made to display warning information about use of the battery according to the number of charging cycles. Therefore, when the number of charging cycles becomes closer to the battery performance limit, a warning can be displayed to urge a user to purchase a new battery. When the number of charging cycles exceeds the battery performance limit, the user can be urged to change the battery. The user can know the use limit of the battery without mistaking an operation fault of the battery for a malfunction of the portable electronic appliance.

BRIEF DESCRIPTION OF THE DRAWINGS

FIG. 9 is a flowchart showing a process in which the kind of a battery is read and warning display and a reduction in power consumption are achieved according to the kind of the battery and the number of charging cycles;

FIG. 10A is a diagram showing an example of a warning display in a case where the number of charging cycles is close to a battery performance limit; and FIG. 10B is a diagram showing an example of a warning display in a case where the number of charging cycles exceeds the battery performance limit.

DETAILED DESCRIPTION OF THE PREFERRED EMBODIMENTS

A digital cameral functioning as a portable electronic appliance in accordance with the present invention and a battery used in the camera will be described as a first preferred embodiment of the present invention with reference to the accompanying drawings.

Figure 3:
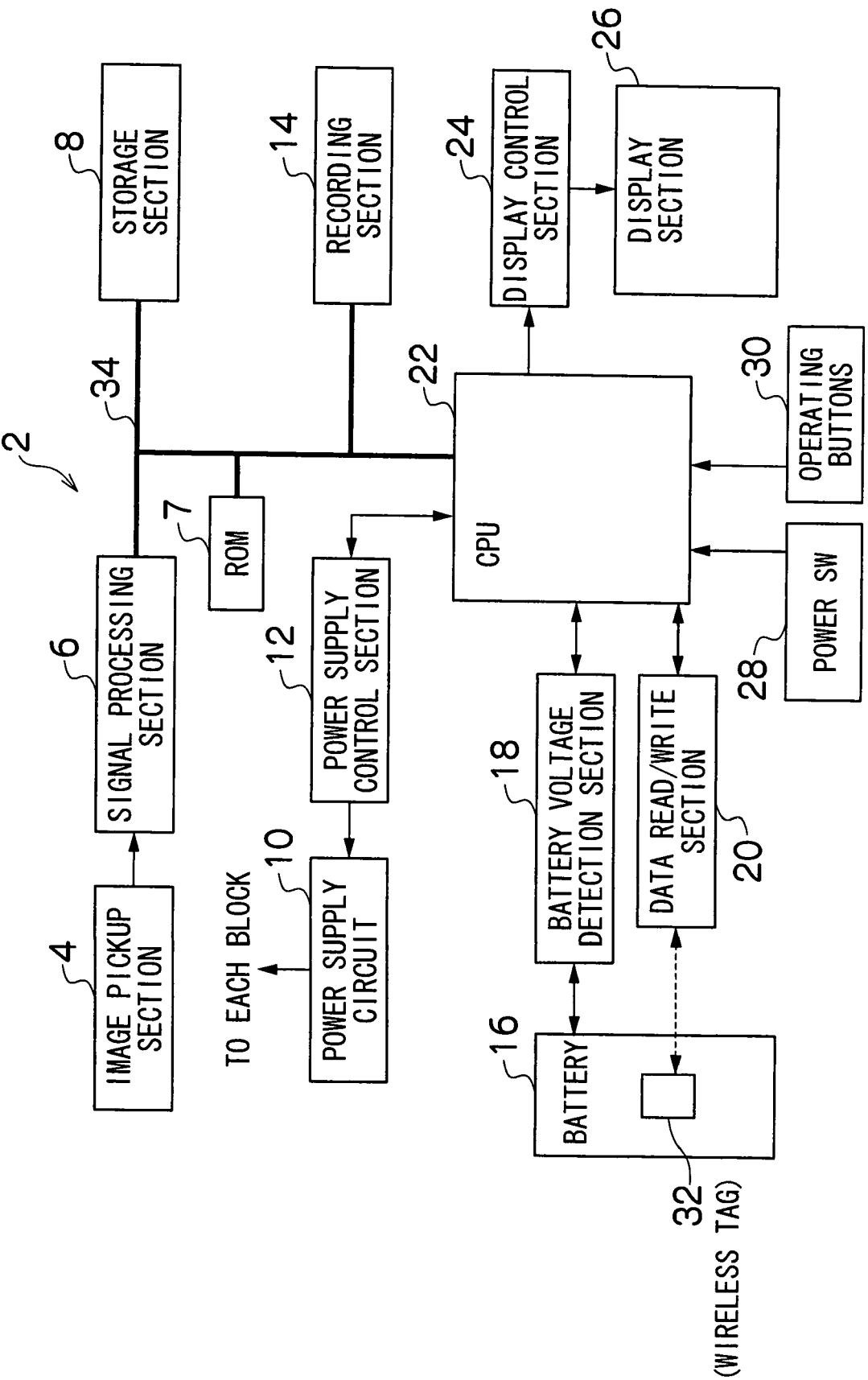
FIG. 3 is a block diagram of a digital camera in a first embodiment of the present invention.

FIG. 3 is a block diagram of the digital camera 2 of the first embodiment of the present invention.

The camera 2 is a digital camera having image recording and reproduction functions. A central processing unit (CPU) 22 performs overall control of the operation of the entire camera 2. The CPU 22 functions as a control device which controls the camera system in accordance with a predetermined program and as an warning generation device which generates battery remaining energy warning information according to a kind of battery identified.

Various sorts of data necessary for the program and control executed by the CPU 22 are stored in a read-only memory (ROM) 7 connected to the CPU 22 via a bus 34. The ROM 7, which is a nonvolatile storage device, may be non-rewritable one or a rewritable one such as an electrically programmable erasable read-only memory (EEPROM).

A storage section 8 is used as a program loading area and a computation work area for the CPU 22 and is also used as an area for temporarily storing image data and audio data.

The camera 2 is provided with operating buttons 30 including a mode selection switch, a picture-taking button, a menu/OK key, a crisscross key and a cancel key. Signals from these various operating buttons 30 are input to the CPU 22. The CPU 22 controls circuits of the camera 2 on the basis of the input signals. For example, the CPU 22 performs lens drive control, picture-taking operation control, image processing control, image data recording/reproduction control, and display control on a display unit 26 through a display control section 24.

The mode selection switch is an operating device for selection between a still picture taking mode, a moving picture taking mode, and a reproduction mode.

The picture-taking button is an operating button for inputting an instruction to start picture taking. In the case of moving picture taking, the picture-taking button functions as an image recording start/stop button. In the case of sill picture taking, the picture-taking button functions as a release button. The picture-taking button is constituted by a two-stroke switch including a switch S1 which is turned on when the picture-taking button is half-depressed, and a switch S2 which is turned on when the picture-taking button is fully depressed.

The menu/OK key is an operating key having a menu button function for instruction to display a menu on the screen of the display unit 26, and an OK button function for instruction, for example, to enter a detail of a selection and to execute a corresponding operation. The crisscross key is an operating portion for inputting instructions relating to four directions, i.e., upward, downward, leftward and rightward directions. The crisscross key functions as a button (cursor-moving operating device) for making a selection from items in the menu display, for making a selection from various setting items in each menu. The up/down key in the crisscross key functions as a zoom switch at the time of picture taking or a reproduction zoom switch at the time of reproduction. The left-right key in the crisscross key functions as a frame feed (forward direction/reverse direction) button in the reproduction mode. The cancel key is used to erase a desired object such as a selected item, to cancel an instruction detail, to restore an immediately preceding operating condition, and so on.

A signal from a power switch 28 is also input to the CPU 22.

The display unit 26 is constituted by a liquid crystal display capable of multicolor display. The display unit 26 can be used as an electronic finder for confirmation of the angle of view at the time of picture taking and is also used as a device for displaying a reproduced recorded image. The display unit 26 is also used as a user interface display screen on which information such as menu information, selected items, setting details, and a battery remaining energy warning is displayed as required. Some other type of display device such as an organic electroluminescent display may be used instead of the liquid crystal display. The display control section 24 performs control for display of display contents on the display unit 26.

The digital camera 2 has a recording section 14 having a medium socket (medium loading portion) and a medium controller. A recording medium can be inserted in the medium socket. The form of the recording medium is not limited to any particular type. Any of various media such as semiconductor memory cards typified by XD-PictureCard (trademark) and SmartMedia (trademark), a portable small hard disk, a magnetic disk, an optical disk and a magneto-optical disk. The medium controller performs signal conversion necessary for input signal exchange suitable for a recording medium inserted in the medium socket.

The picture-taking functions of the digital camera 2 will be described.

When the still picture taking mode or the moving picture taking mode is selected with the mode selection switch, power is supplied to an image pickup section 4 including a charge-coupled device (CCD) solid image pickup device (hereinafter referred to as "CCD") to make the camera ready to perform picture taking.

The image pickup section 4 includes a lens unit which is an optical unit including a picture-taking lens including a focusing lens, and a mechanical shutter also functioning as a diaphragm. The lens unit is electrically driven by a lens drive section and a diaphragm drive section controlled by the CPU 22 to perform zoom control, focusing control and iris control.

Light passed through the lens unit is imaged on a light receiving surface of the CCD. A multiplicity of photodiodes (light receiving elements) are two-dimensionally arrayed in the light receiving surface of the CCD. Red (R), green (G) and blue (B) elements of a primary color filter are arrayed in a predetermined array structure (a Bayer pattern, a G-stripe pattern or the like) in correspondence with the photodiodes. The CCD has an electronic shutter function, i.e., the function of controlling the charge accumulation time (shutter speed) of each photodiode. The CPU 22 controls the charge accumulation time of the CCD through a timing generator (not shown). Some other type of image pickup device such as a MOS type may be used instead of the above-described CCD.

An object image imaged on the light receiving surface of the CCD is converted into amounts of signal charge corresponding to the quantities of incident light by the photodiodes. The signal charges accumulated on the photodiodes are successively read out as a voltage signal (image signal) corresponding to the signal charges on the basis of drive pulses supplied from the timing generator according to an instruction from the CPU 22.

The signal output from the CCD, R, G, and B signals corresponding to pixels are sampled and held (by correlative double sampling processing) and amplified. The successively input R, G and B signals are converted into a digital signal to be output to a signal processing section 6.

The digital image signal is input to the signal processing section 6 through an image input controller (not shown) and the image processing section 6 processes the input digital image signal according to an instruction from the CPU 22. That is, the image processing section 6 functions as an image processing device including a concurrentization circuit (a processing circuit for converting the color signals into a concurrent equation by interpolating special shifts of the color signals accompanying the color filter array of on a single-plate CCD), a luminance and color difference signal generation circuit, a gamma correction circuit, a contour correction circuit and a white balancing correction circuit. The image processing circuit 6 performs predetermined signal processing by making use of the storage section 8 according to a command from the CPU 22.

The image input controller includes a memory controller which performs control of read-out of data from the storage section 8 and write of data to the storage section 8.

RGB image data input to the signal processing section 6 is converted into a luminance signal (Y signal) and color-difference signals (Cr and Cb signals) in the signal processing section 6 and undergo plurality of processing including gamma correction. The image data processed in the signal processing section 6 is stored in the storage section 8.

When a photographed image is output through the display section 26 to be monitored, the image data is read out from the storage section 8 and is supplied to the display control section 24 via the bus 34. The display control section 24 converts the input image data into a signal in a predetermined display format (e.g., NTSC color composite video signal) and outputs the signal to the display section 26.

When the power switch 28 and the operating button 30 are operated to supply signals to the CPU 22, the CPU 22 sends a control signal for controlling the power supply to a power supply control section 12. The power supply control section 12 controls a power supply circuit 10 so that the power supply circuit supplies power to each block.

Figure 6:
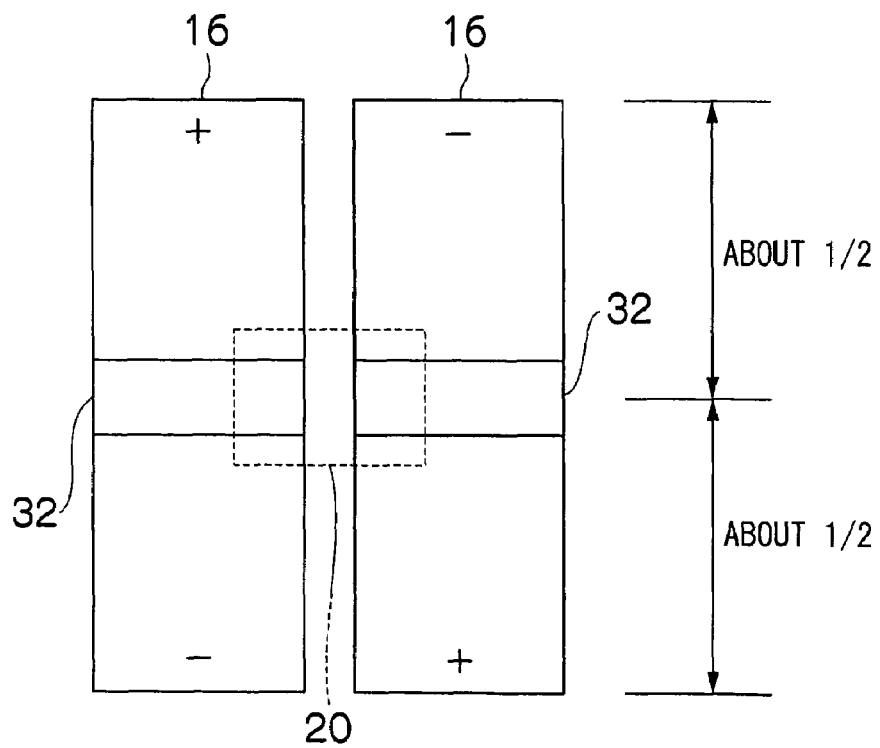
FIG. 6 is a diagram showing a state in which a wireless tag is provided on each of two AA batteries at a center in the lengthwise direction, the batteries are accommodated in a battery box in a state of being revered in the lengthwise direction relative to each other, and a battery data reading section is provided in one place in the battery box at a center in the lengthwise direction and in the widthwise direction.

A DC power supply can be used for power supply. However, batteries 16 are ordinarily used. As shown in FIG. 6, a wireless tag 32 in the form of a chip in which information on each battery 16 is stored is embedded in a portion of the battery 16 at a center in the lengthwise direction of the battery 16. For example, the information held in the wireless tag 32 is information indicating the kind of the battery, i.e., information as to whether the battery is a primary battery or a secondary battery, as to whether the battery is a manganese battery, an alkaline battery or a lithium battery if the battery is a primary battery, and as to whether the battery is a nickel-cadmium battery or a nickel metal hydride battery if the battery is a secondary battery, and information indicating the name of the manufacturer of the battery.

The wireless tag 32 is not limited to the above-mentioned chip type. A wireless tag in the form of a band formed around the battery may alternatively be used.

A data read/write section 20 is provided in such a position as to be able to detect the wireless tag 32 embedded in the battery 16 when the battery 16 is accommodated in a battery box in the digital camera 2. The data read/write section 20 detects the wireless tag 32 and reads the information about the battery according to an instruction from the CPU 22, and sends the read information to the CPU 22. The CPU 22 identifies the kind of battery, the name of the manufacturer, and so on from the read battery information.

In the digital camera 2 of the present invention, two AA batteries are accommodated in the battery box in a state of being reversed in lengthwise direction relative to each other. As shown in FIG. 6, the data read/write section 20 is formed in an inner wall surface of the battery box in one place at a center in the lengthwise direction and in the widthwise direction of the battery box, thus enabling one data read/write section 20 to detect the wireless tags 32 of the two batteries.

In this case, the data read/write section 20 detects the wireless tag 32 on the first battery and then detects the wireless tag 32 on the second battery with a certain delay from the moment at which it detects the wireless tag 32 on the first battery. The CPU 22 simultaneously receives the battery information stored in the detected wireless tag 32 of the first battery and the battery information stored in the detected wireless tag 32 of the second battery.

The data read/write section 20 may be formed along a circumferential direction on the inner wall surface of the box at a center of the lengthwise direction of the battery box. If the data read/write section 20 is formed in this manner, it can detect the wireless tag 32 easily and reliably regardless of the attached position of the wireless tag 32 in the circumferential direction as long as the wireless tag 32 is attached at the center of the lengthwise direction of the battery.

Figure 5:
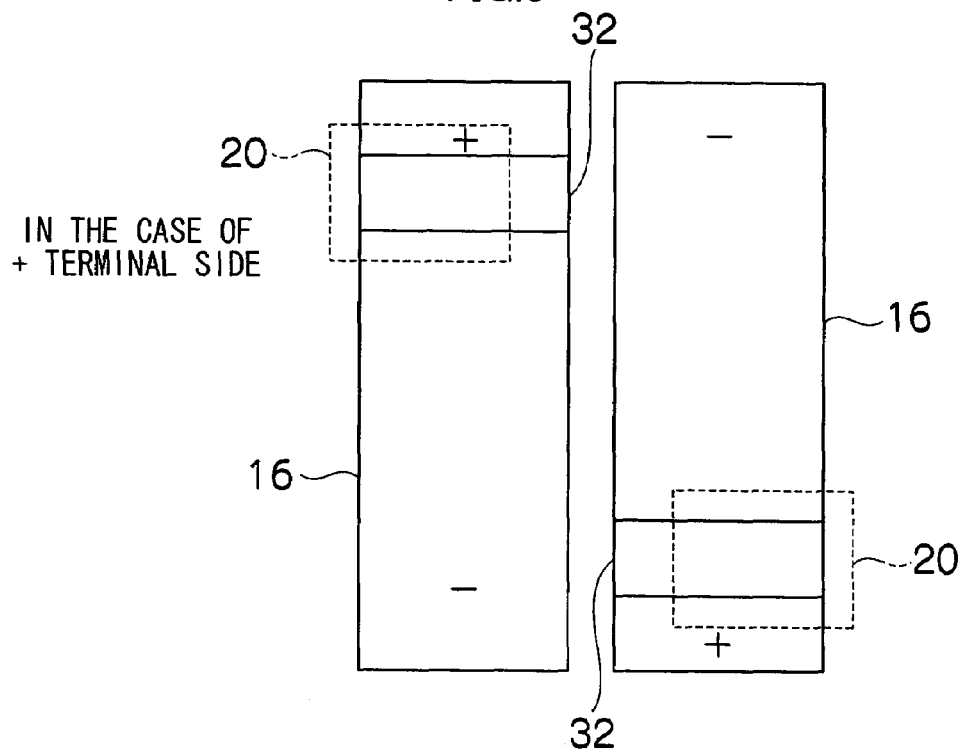
FIG. 5 is a diagram showing a state in which a wireless tag is provided close to one end of each of two AA batteries, the batteries are accommodated in a battery box in a state of being revered in the lengthwise direction relative to each other, and battery data reading sections are provided in two places in the battery box.

If the wireless tag 32 is provided on the battery 16 closer to one end of the battery as shown in FIG. 5, there is a need to provide the data read/write section 20 in two places in the battery box by considering a case where two AA batteries are accommodated in a sate of being reversed in lengthwise direction relative to each other. Therefore, it is markedly advantageous to attach the wireless tag 32 approximately at the center of the lengthwise direction of the battery 16 so that the data read/write section 20 provided in only one place suffices as described above.

A battery voltage detection section 18 detects the voltage of the battery 16 according to an instruction from the CPU 22. The result of detection of the voltage is sent to the CPU 22. On the basis of the detection result, the CPU 22 generates a predetermined warning sign and a signal for turning off the power supply.

The process of displaying a battery remaining energy warning sign in use of this digital camera 2 will be described.

Description will first be made by way of example of an AA alkaline battery which is a primary battery and an AA nickel metal hydride battery which is a secondary battery.

Figure 1:
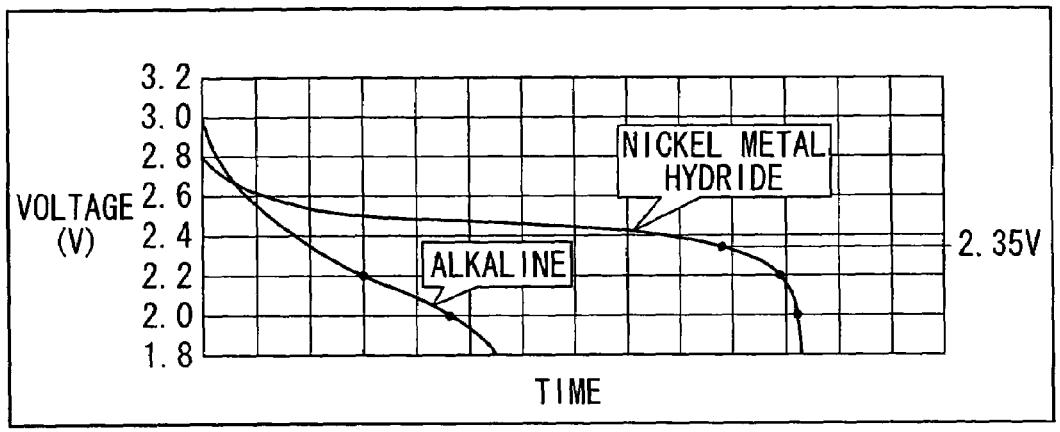
FIG. 1 comprises a graph showing discharge characteristics of an AA alkaline battery and an AA nickel metal hydride battery and a table relating setting of a pre-end voltage and an end voltage.

FIG. 1 comprises a diagram showing discharge characteristics of an AA alkaline battery and an AA nickel metal hydride battery, and a table of setting of a pre-end voltage and an end voltage.

In a conventional digital camera, the pre-end voltage (i.e., the voltage at which information that the amount of remaining battery energy is small is given) of an AA alkaline battery is set to 2.2 V and the end voltage (i.e., the voltage at which information that the battery energy is lost is given) is set to 2.0 V. If this setting is made in the case of use of an AA alkaline battery, a warning sign is displayed when the amount of energy used becomes 65%. If this setting is made in the case of use of an AA nickel metal hydride battery, the warning sign is displayed when the amount of energy used becomes 96%. That is, the AA alkaline battery can be used for a while after the warning sign has been displayed. On the other hand, the AA nickel metal hydride battery becomes unusable in a short time after the warning sign has been displayed.

In this embodiment, the information on the kind of a battery is stored in the wireless tag and the digital camera detects the wireless tag and reads the information on the kind of the battery to recognize the kind of the battery in use. Therefore the CPU 22 can generate a warning sign according to the kind of the battery. More specifically, with respect to an AA alkaline battery, the pre-end voltage is set to 2.2 V, the same voltage as that in the conventional digital camera. With respect to an AA nickel metal hydride battery, the pre-end voltage is set to 2.35 V. Thus, even in the case of use of an AA nickel metal hydride battery, the same remaining use time as that in the case of use of an AA alkaline battery can be ensured. The end voltage is a voltage reached immediately before the remaining energy of the battery is lost, i.e., several seconds before the power supply is shut off (the camera enters a state where it cannot operate for photography). Therefore the end voltage is set to 2.0 V, the same voltage as that in the conventional camera with respect to each kind of the battery.

In the above-described example, the pre-end voltage of each kind of battery is set with reference to the remaining use time of the battery. Alternatively, the pre-end voltage can be set with reference to the proportion of the amount of energy used in the full amount of energy of the battery. For example, the pre-end voltage of each kind of battery may be set when the proportion of the amount of energy used in the full amount of energy becomes 65%, and a warning sign may be displayed when the pre-end voltage is reached.

Figure 4:
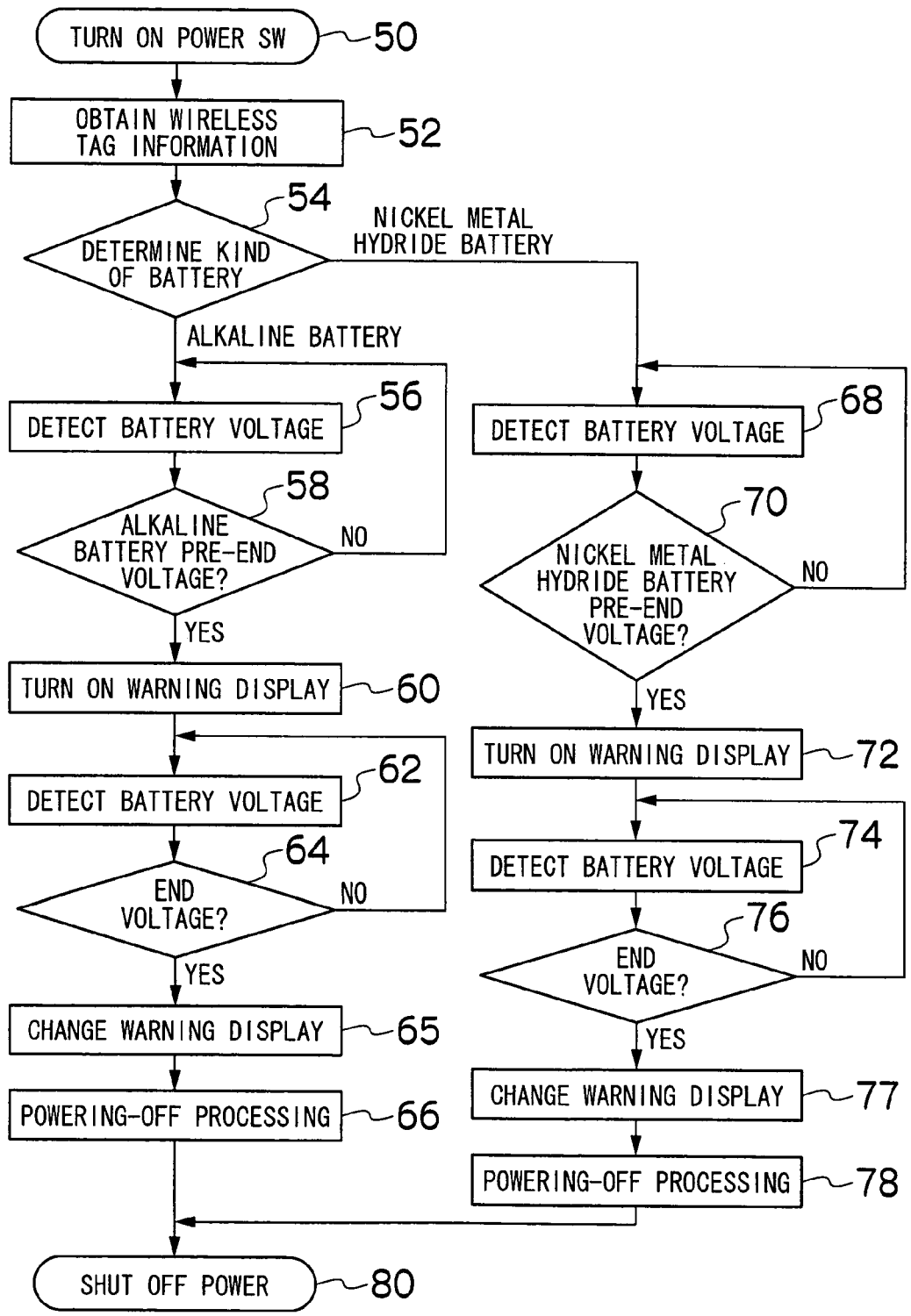
FIG. 4 is a flowchart showing the flow from display of a battery remaining energy warning to shutting off of the power in use of the digital camera.

FIG. 4 is a flowchart showing a process using the digital camera 2 in which a battery remaining energy warning is displayed and the power supply is thereafter shut off.

The power switch 28 is first turned on (step 50).

The data read/write section 20 detects the wireless tag 32 of each battery 16 and reads the information about the battery 16. The data read/write section 20 sends to the read information about the battery 16 to the CPU 22. The CPU 22 receives the information about the battery 16 (step 52).

From the received battery information, the CPU 22 determines that the batteries have been set and identifies the kind of the batteries (step 54).

If it is thereby determined that the batteries are alkaline batteries, the battery voltage detection section 18 detects the voltage value of each battery 16 (step 56). The detected voltage value is sent to the CPU 22. The CPU 22 determines whether or not the detected voltage value is equal to the pre-end voltage of the alkaline battery (step 58). If the pre-end voltage has not been reached, the process returns to step 56. If the pre-end voltage has been reached, the CPU 22 generates warning information and makes the display section 26 display a warning sign (step 60).

Figure 2:
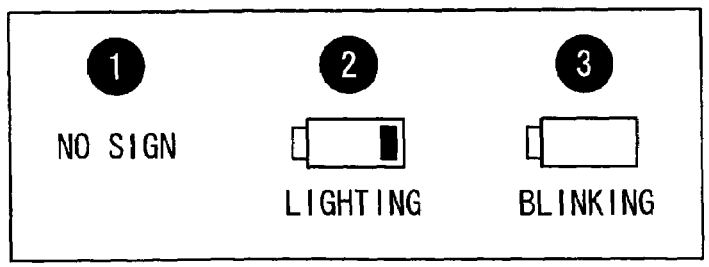
FIG. 2 is a diagram showing an example of warning signs displayed in a display section.

FIG. 2 shows an example of the warning sign displayed by the display section 26. During ordinary use, i.e., in a state where the battery voltage value is lower than the pre-end voltage, no battery sign is displayed (<1>). When the battery voltage value becomes equal to the pre-end voltage, a battery energy mark including one mark indicating the remaining energy is lighted (<2>).

The battery voltage detection section 18 further detects the voltage value of the battery 16 (step 62). The detected voltage value is sent to the CPU 22. The CPU 22 determines whether or not the detected voltage value is equal to the end voltage of the alkaline battery (step 64). If the end voltage has not been reached, the process returns to step 62. If the end voltage has been reached, the CPU 22 changes the warning sign display on the display section 26 and makes the display section 26 display a sign after the detection of the end voltage (<3> in FIG. 2) (step 65). This sign is blinking of the battery mark.

Thereafter, powering-off processing is performed (step 66) to turn off the power supply (step 80).

If the result of determination of the kind of the battery in step 54 is that the batteries are nickel metal hydride batteries, the battery voltage detection section 18 detects the voltage value of each battery 16 (step 68). The detected voltage value is sent to the CPU 22. The CPU 22 determines whether or not the detected voltage value is equal to the pre-end voltage of the nickel metal hydride battery (step 70). If the pre-end voltage has not been reached, the process returns to step 68. If the pre-end voltage has been reached, the CPU 22 generates warning information and makes the display section 26 display a warning sign (step 72). The example of the warning sign shown in FIG. 2 is also used in the case of the nickel metal hydride battery. During ordinary use, i.e., in a state where the battery voltage value is lower than the pre-end voltage, no battery sign is displayed (<1>). When the battery voltage value becomes equal to the pre-end voltage, a battery energy mark including one mark indicating the remaining energy is lighted (<2>).

The battery voltage detection section 18 further detects the voltage value of the battery 16 (step 74). The detected voltage value is sent to the CPU 22. The CPU 22 determines whether or not the detected voltage value is equal to the end voltage of the nickel metal hydride battery (step 76). If the end voltage has not been reached, the process returns to step 74. If the end voltage has been reached, the CPU 22 changes the warning sign display on the display section 26 and makes the display section 26 display a sign after the detection of the end voltage (<3> in FIG. 2) (step 77). This sign is blinking of the battery mark.

Thereafter, powering-off processing is performed (step 78) to turn off the power supply (step 80).

In this embodiment, the display section 26 is liquid crystal display capable of multicolor display and the battery warning sign is displayed on the liquid crystal display. However, the display system is not limited to this. The battery warning sign may be displayed on a liquid crystal display for displaying characters provided separately from the liquid crystal display for displaying images.

In this embodiment, the battery remaining energy warning sign is displayed at two stages: the stage after detection of the pre-end voltage and the stage after detection of the end voltage. However, the display system is not limited to this. The display section may be made to indicate the battery remaining energy more finely after the digital camera 2 has recognized the kind of battery.

The arrangement of this embodiment ensures that a user can correctly recognize the usable range of the battery regardless of the kind of battery. Therefore, even in a case where the user uses a certain kind of battery and thereafter substitutes a different kind of battery, the user can use such a reliable guide for selection of a time to change the battery and can prepare the next battery at a suitable time.

In the above-described example of the arrangement, information on the kind of a battery is stored in the wireless tag and the digital camera detects the wireless tag and reads the information on the kind of the battery to recognize the kind of the battery presently in use. Information other than the information on the kind of battery, e.g., information on the name of the manufactuer of the battery may also be stored in the wireless tag and the battery remaining energy warning sign may be generated on the basis of the battery capacity varying slightly among manufacturer and the kind of battery.

While this embodiment has been described by assuming that the object to which the present invention is applied is a digital camera, the present invention can of course be applied to portable electronic appliances other than digital cameras.

A digital camera which functions as a portable electronic appliance in accordance with the present invention will be described as a second preferred embodiment of the present invention with reference to the accompanying drawings. The same components as those in the first embodiment are indicated by the same reference numerals and the description for them will not be repeated.

Figure 7:
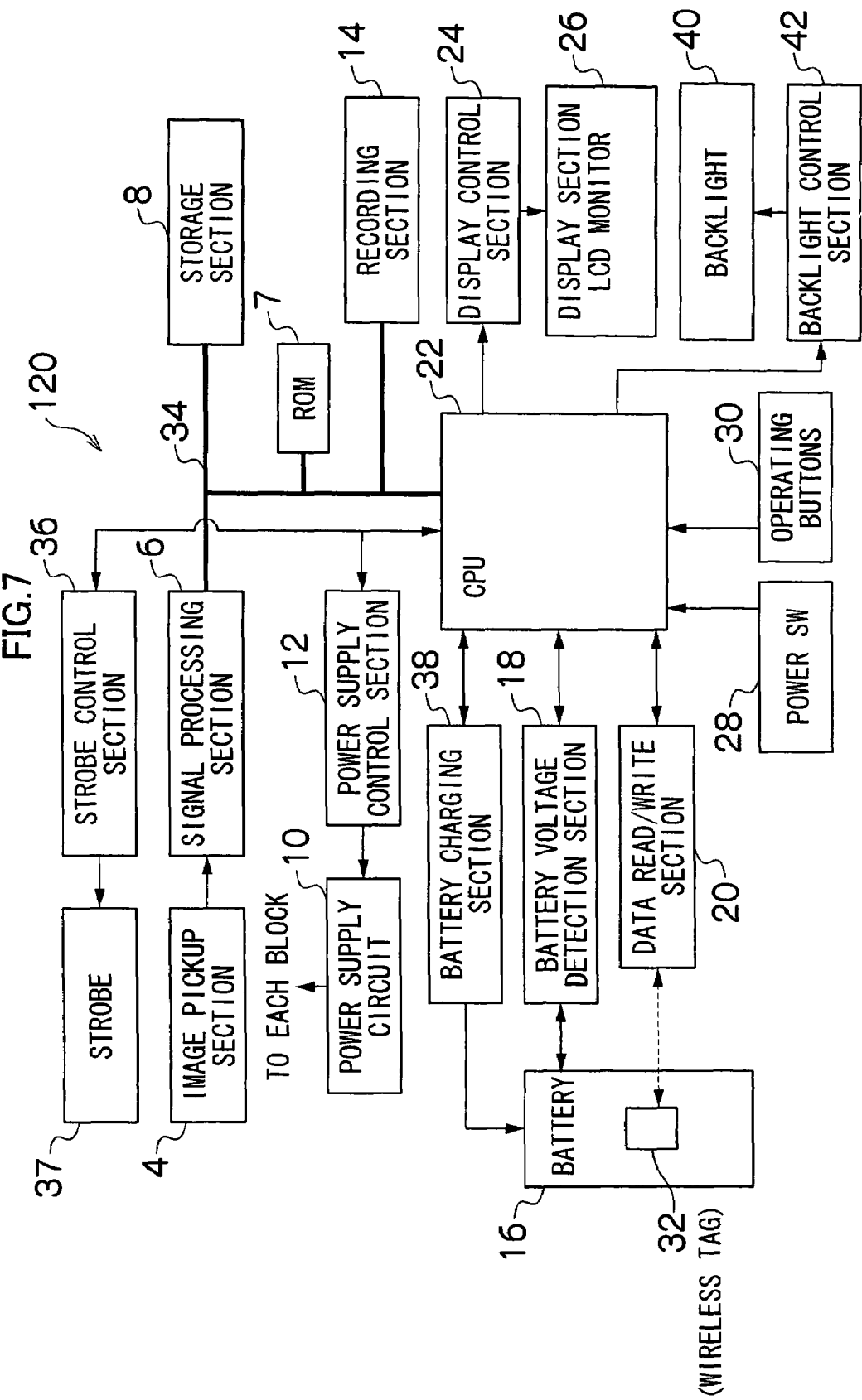
FIG. 7 is a block diagram of a digital camera in a second embodiment of the present invention.

FIG. 7 is a block diagram showing the digital camera 120 of the second embodiment of the present invention.

The camera 120 is a digital camera having image recording and reproduction functions. A central processing unit (CPU) 22 performs overall control of the operation of the entire camera 120. The CPU 22 functions as a control device which controls the camera system in accordance with a predetermined program and as a control command generation device which performs such control as to reduce the power consumption of the digital camera 120 according to a kind of battery identified.

The program and control executed by the CPU 22, various sorts of data necessary for control, etc., are stored in a ROM 7 connected to the CPU 22 via a bus 34.

A storage section 8 is used as a program loading area and a computation work area for the CPU 22 and is also used as an area for temporarily storing image data and audio data.

The camera 120 is provided with operating buttons 30 including a mode selection switch, a picture-taking button, a menu/OK key, a crisscross key and a cancel key. Signals from these various operating buttons 30 are input to the CPU 22. The CPU 22 controls circuits of the camera 120 on the basis of the input signals, and also controls a strobe 37 through a strobe control section 36.

A display control section 24 performs a predetermined operation for displaying display contents on a display section 26 on the basis of an instruction from the CPU 22. Display contents on the display section 26 are made visible by lighting with a backlight 40 provided in the display section 26. Control of lighting with the backlight 40 and the brightness of the backlight 40 is performed by a backlight control section 42 on the basis of an instruction from the CPU 22.

When a photographed image is output through the display section 26 to be monitored, the image data is read out from the storage section 8 and is supplied to the display control section 24 via the bus 34. The display control section 24 converts the input image data into a signal in a predetermined display format (e.g., NTSC color composite video signal) and outputs the signal to the display section 26. When the photographed image is output through the display section 26 to be monitored, the backlight 40 is lighted by being linked to the image output. During picture taking, the backlight 40 is lighted. The backlight 40 is also lighted during reproduction. However, lighting is stopped for energy saving if no key operation is performed during a certain period of time while reproduction is being performed.

When the power switch 28 and the operating button 30 are operated to supply signals to the CPU 22, the CPU 22 sends a control signal for controlling the power supply to a power supply control section 12. The power supply control section 12 controls a power supply circuit 10 so that the power supply circuit 10 supplies a necessary amount of power to each block.

A DC power supply can be used for power supply. However, batteries are ordinarily used.

If the batteries 16 are secondary batteries, they can be charged by operating a battery charging section 38 on the basis of an instruction from the CPU 22. In this case, additional power is supplied from a DC power supply connected to the digital camera 120.

The process of reducing the power consumption of the digital camera 120 will be described.

With reference to FIG. 1, description will first be made by way of example of the characteristics of an AA alkaline battery which is a primary battery and an AA nickel metal hydride battery which is a secondary battery.

In a conventional digital camera, the pre-end voltage (i.e., the voltage at which information that the amount of remaining battery energy is small is given on the display section 26) of an AA alkaline battery is set to 2.2 V and the end voltage (i.e., the voltage at which information that the battery energy is lost is given on the display section 26) is set to 2.0 V. If this setting is made in the case of use of an AA alkaline battery, a warning sign is displayed when the amount of energy used becomes 65%. If this setting is made in the case of use of an AA nickel metal hydride battery, the warning sign is displayed when the amount of energy used becomes 96%. In each kind of battery, the amount of energy used is 100% when the battery voltage becomes equal to the end voltage.

As can be understood from the discharge characteristics of the two kinds of batteries, the nickel metal hydride battery lives longer than the alkaline battery if the same power control is performed on the digital camera 120. It is generally known that the internal impedance of alkaline batteries is higher than that of nickel metal hydride batteries. When an alkaline battery is used, the power consumption may be reduced to limit the voltage drop and increase the battery life. Also, discharge during use at a low temperature can be reduced thereby.

In the second embodiment, the data read/write section 20 detects the wireless tag 32 attached to the battery 16 and reads the battery information to achieve a reduction in power consumption according to the kind of battery.

Figure 8:
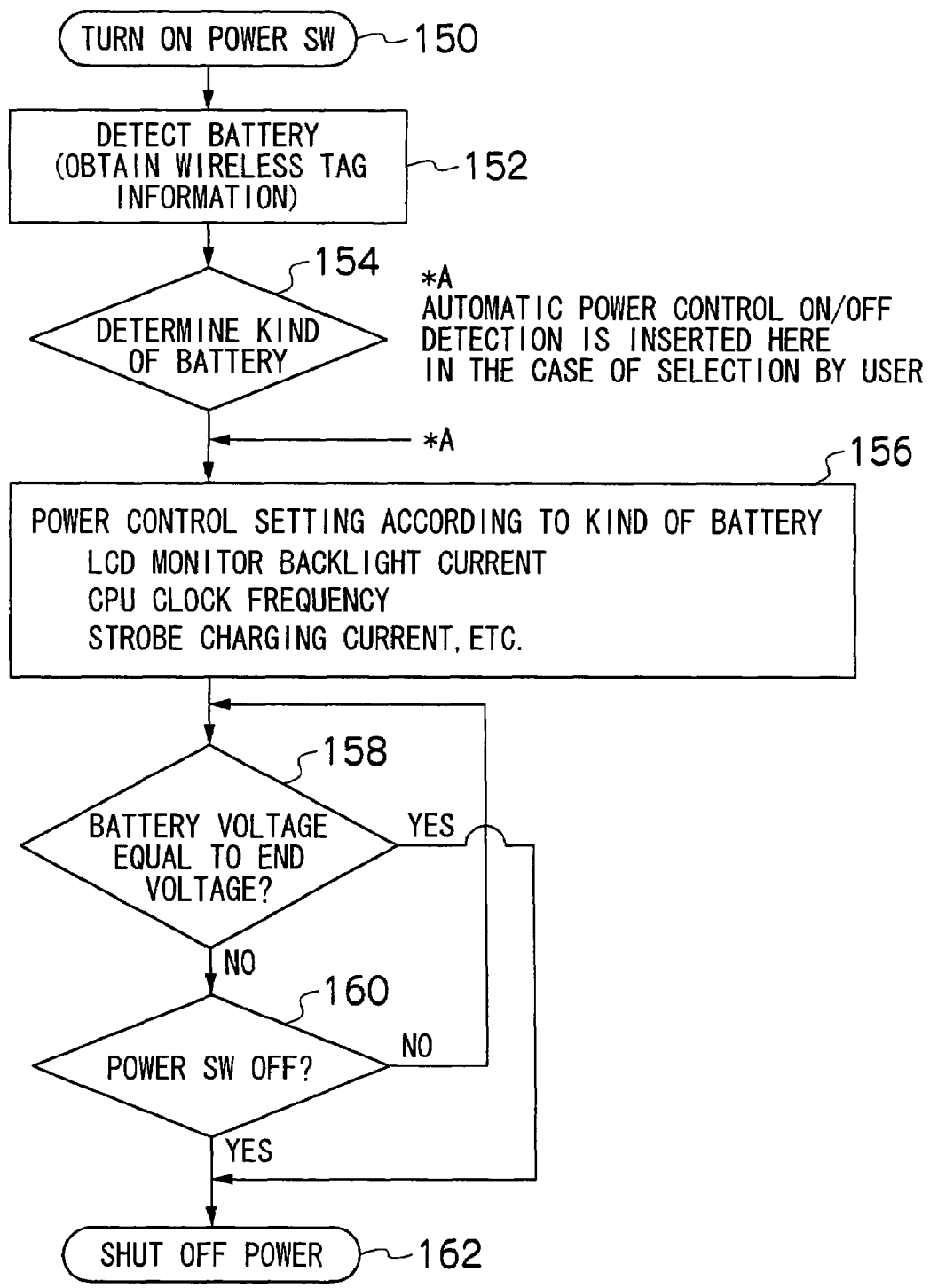
FIG. 8 is a flowchart showing a process in which the kind of a battery is read and the power consumption is reduced according to the kind of the battery.

The flow of operation in the case of reducing the power consumption will be described with reference to FIG. 8. FIG. 8 is a flowchart showing a process in which the kind of a battery is read and the power consumption is reduced according to the kind of the battery.

First, the power switch 28 is turned on (step 150). The data read/write section 20 detects the wireless tag 32 of each battery 16 and reads battery information stored in the wireless tag 32 (step 152).

The kind of the battery is identified from the read battery information (step 154). That is, the read battery information is sent to the CPU 22, and the CPU 22 identifies the kind of battery to determine whether each battery presently used is, for example, an alkaline battery, a nickel metal hydride battery or some other kind of battery.

If it is thereby determined that the battery is of such a kind that the internal impedance is high (e.g., alkaline battery), the current for lighting the backlight 40 of the display section (liquid crystal monitor) 26 is reduced to dim the light, the clock frequency of the CPU 22 is reduced to reduce the processing speed, and the strobe 37 charging current is reduced to reduce the charging time (step 156). These operations are automatically performed. As a result, the power consumption is reduced and the rate at which the battery voltage decreases is reduced. A setting may be made in advance to perform a power reducing operation suitable for use of each kind of battery.

With respect to a kind of battery having a high internal impedance, a setting may be made such that when the ambient temperature is reduced, another power consumption reducing operation is performed in addition to the above-described operation in step 156 to automatically turn off the display section 26 for the purpose of extending the time period during which the digital camera 120 is usable.

A user may select a mode in which the digital camera 120 does not perform the power reducing operation in step 156. The user may make as this selection an automatic power supply control on/off setting in advance. In such a case, the function of performing detection as to whether or not the automatic power supply control on/off setting has been made is added to the digital camera 120. That is, if the automatic power supply control on/off setting is made according to a user's selection, an operation for automatic power supply control on/off detection is performed immediately before step 156 (*A in FIG. 8). If the automatic power supply control on state is detected, the process proceeds directly to step 156. If the automatic power supply control off state is detected, the process proceeds directly to step 158 instead of proceeding to step 156. The reason for enabling this selection is that a user may wish to normally perform the functions relating to step 156 with priority over the processing for reducing the power consumption.

Subsequently, determination is made as to whether or not the battery voltage has reached the end voltage (step 158). If the battery voltage has reached the end voltage, the power supply is shut off (step 162). If the battery voltage has not reached the end voltage, determination is then made as to whether the power switch has been turned off (step 160). If the power switch has not been turned off, the process returns to step 158. If the power switch has been turned off, the process proceeds to step 162 and the power supply is shut off.

In the second embodiment, power control on the digital camera is automatically performed according to the kind of battery and, therefore, the time period during which the digital camera can be used does not change largely when the kind of battery is changed. Consequently, a user can use the digital camera without being concerned about the kind of battery.

In the description of the second embodiment, three methods have been mentioned as a power control setting in step 156. However, one or two of the above-described three methods may be selectively used.

In the second embodiment, power control is performed according to the kind of battery. However, power control may be also performed according to the manufacturer of the battery. In such a case, the name of the battery manufacturer may be included in the information stored in the wireless tag 32 along with the kind of battery and battery power consumption control may be performed according to the battery capacity varying slightly among manufacturers as well as according to the kind of battery.

A setting may also be made according to a user's preference with respect to step 156 such that the setting is not automatically changed in step 156.

While this embodiment has been described by assuming that the object to which the present invention is applied is a digital camera, the present invention can of course be applied to portable electronic appliances other than digital cameras.

A digital camera which functions as a portable electronic appliance in accordance with the present invention will be described as a third preferred embodiment of the present invention with reference to the accompanying drawings. The same components as those in the second embodiment are indicated by the same reference numerals and the description for them will not be repeated.

This camera 120 is a digital camera having image recording and reproduction functions. A central processing unit (CPU) 22 performs overall control of the operation of the entire camera 120. The CPU 22 functions as a control device which controls the camera system in accordance with a predetermined program, as a warning generation device which, if the battery is a secondary battery, counts the number of times the battery 16 has been charged in the digital camera 120 (the number of charging cycles), and which displays warning information about the battery according to the number of charging cycles, and as a power reduction instruction device which, if the battery is a secondary battery, issues an instruction to reduce the power consumption according to the number of charging cycles.

The program executed by the CPU 22, various sorts of data necessary for control, etc., are stored in a ROM 7 connected to the CPU 22 via a bus 34.

A storage section 8 is used as a program loading area and a computation work area for the CPU 22 and is also used as an area for temporarily storing image data and audio data. The number of cycles of charging of the battery in the digital camera 120, counted by the CPU 22, is stored in the storage section 8.

The camera 120 is provided with operating buttons 30 including a mode selection switch, a picture-taking button, a menu/OK key, a crisscross key and a cancel key. Signals from these various operating buttons 30 are input to the CPU 22. The CPU 22 controls circuits of the camera 120 on the basis of the input signals, and also controls a strobe 37 through a strobe control section 36.

The display section 26 is also used as a user interface display screen on which information such as menu information, selected items, setting details, a battery remaining energy warning is displayed as required.

Information provided in a wireless tag 32 embedded in each of batteries 16 includes information indicating the kind of the battery, i.e., information as to whether the battery is a primary battery or a secondary battery, as to whether the battery is a manganese battery, an alkaline battery or a lithium battery if the battery is a primary battery, and as to whether the battery is a nickel-cadmium battery or a nickel metal hydride battery if the battery is a secondary battery, information indicating the name of the manufacturer of the battery, and a manufacturer's serial number uniquely assigned to the battery.

A data read/write section 20 is provided in such a position as to be able to detect the wireless tag 32 embedded in the battery 16 when the battery 16 is accommodated in a battery box in the digital camera 120. The data read/write section 20 detects the wireless tag 32 and reads the information about the battery according to an instruction from the CPU 22, and sends the read information to the CPU 22. The CPU 22 identifies the kind of battery, the name of the manufacturer, the manufacturer's serial number uniquely assigned to the battery, and so on from the read battery information. The data read/write section 20 writes to the wireless tag 32 the number of times the battery 16 has been charged in the digital camera 120 each time the battery 16 is charged.

If the batteries 16 are secondary batteries, they can be charged by operating a battery charging section 38 on the basis of an instruction from the CPU 22. In this case, additional power is supplied from a DC power supply connected to the digital camera 120. After the completion of charging by the battery charging section 38, information indicating the completion of charging is sent to the CPU 22, and the CPU 22 counts one charging cycle and sends one charging cycle count to the storage section 8. In the storage section 8, the total number of charging cycles is stored.

The process of displaying a warning and reducing the power consumption according to the number of charging cycles in the digital camera 120 will be described.

In this embodiment, the data read/write section 20 detects the wireless tag 32 attached to each battery 16 and reads the battery information, thereby achieving warning display and a reduction in power consumption according to the kind of battery and the number of charging cycles.

The flow of operation in the case of displaying a warning and reducing the power consumption will be described with reference to FIG. 9. FIG. 9 is a flowchart showing a process in which the kind of a battery is read and a warning is displayed and the power consumption is reduced according to the kind of the battery and the number of charging cycles.

First, the power switch 28 is turned on (step 250). The data read/write section 20 detects the wireless tag 32 of each battery 16 and reads battery information stored in the wireless tag 32 (step 252).

The kind of the battery is identified from the read battery information (step 254). That is, the read battery information is sent to the CPU 22, and the CPU 22 identifies the kind of battery to determine whether each battery presently used is, for example, an alkaline battery, a nickel metal hydride battery or some other kind of battery. Accordingly, determination is also made automatically as to whether the battery is a primary battery or a secondary battery.

If it is thereby determined that the battery is a primary battery, the process proceeds to step 262 and determination is made as to whether the power switch has been turned off. If it is determined that the battery is a secondary battery, the number of cycles of charging of the battery stored in the storage section 8 is checked by referring to the manufacturer's serial number of the battery. In a case where information on the number of cycles of charging of the battery is stored in the wireless tag 32, the number of charging cycles can be checked by only reading the battery information in the wireless tag 32 instead of obtaining the information through the above-described step.

If it is determined in step 254 that the number of cycles of charging of the battery is not larger than the battery performance limit, determination is then made as to whether the number of charging cycles is close to the battery performance limit (step 256). If the number of battery charging cycles is not close to limit, a power control setting according to the number of battery charging cycles is made (step 260). That is, if the number of battery charging cycles is not so large, an operation <1> to reduce the current for charging of the strobe 37 in order to increase the charting time is performed. If the number of battery charging cycles is a medium number, an operation <2> to reduce the clock frequency of the CPU 22 in order to reduce the processing speed is performed in addition to the operation <1>. If the number of battery charging cycles is large, an operation <3> to reduce the current for the backlight 40 of the display section (liquid crystal monitor) 26 and dim the light is performed in addition to the operations <1> and <2>. These operations are automatically performed. As a result, the power consumption is reduced and the rate at which the battery voltage decreases is reduced. A setting for enabling the power reducing operation according to each of different kinds of battery may be made in advance.

With respect to a kind of battery having a high internal impedance, a setting may be made such that when the ambient temperature is reduced, another power consumption reducing operation is performed in addition to the above-described operation in step 260 to automatically turn off the display section 26 for the purpose of extending the time period during which the digital camera 120 is usable.

A user may select a mode in which the digital camera 120 does not perform the power reducing operation in step 260. The user may make as this selection an automatic power supply control on/off setting in advance. In such a case, the function of performing detection as to whether or not the automatic power supply control on/off setting has been made is added to the digital camera 120. That is, if the automatic power supply control on/off setting is made according to a user's selection, an operation for automatic power supply control on/off detection is performed immediately before step 260. If the automatic power supply control on state is detected, the process proceeds directly to step 260. If the automatic power supply control off state is detected, the process proceeds directly to step 262 instead of proceeding to step 260. The reason for enabling this selection is that a user may wish to normally perform the functions relating to step 260 with priority over the processing for reducing the power consumption.

After step 260, determination is made as to whether the power switch has been turned off (step 262). If the power switch has not been turned off, the process returns to step 262. If the power switch has been turned off, the process proceeds to step 264 and the power supply is shut off.

If it is determined in step 254 that the number of battery charging cycles exceeds the battery performance limit or if it is determined in step 256 that the number of battery charging cycles is close to the battery performance limit, a charging cycle warning sign is displayed on the display section (liquid crystal monitor) 26 (step 258). For example, as this warning sign, a sign such as shown in FIG. 10A may be displayed in a case where the number of charging cycles is close to the battery performance limit. In a case where the number of charging cycles exceeds the battery performance limit, a sign such as shown in FIG. 10B may be displayed.

After step 258, the process proceeds to the above-described step 260. In this case, since the number of charging cycles is close to the battery performance limit or exceeds the limit, the operations <1>, <2>, and <3> in step 260 are simultaneously executed. This is particularly effective in the case of use of a lithium ion battery because the lithium ion battery has such a property that the usable time is reduced as the battery capacity decreases with the increase in the number of charging cycles.

In the third embodiment, an warning is automatically displayed on the digital camera according to the kind of battery and the number of charging cycles to enable a user to easily grasp the battery use limit and to prepare a new battery without mistaking a degraded state of the battery for a malfunction of the camera. In a case where the digital camera is used until the battery use limit is exceeded, a low-power-consumption setting is made to increase the operating time of the battery and to enable use of the battery for a while even after the user has forgotten to change the battery.

In the description of the third embodiment, three methods have been mentioned as a power control setting in step 260. However, a combination of two of the above-described three methods may be used.

A setting may also be made according to a user's preference with respect to step 260 such that the setting is not automatically changed in step 260.

If information on the number of battery charging cycles is stored in the wireless tag 32, the number of cycles of charging with a charger other than the digital camera 120 can be ascertained and an accurate warning sign and power consumption reducing setting can be made.

While this embodiment has been described by assuming that the object to which the present invention is applied is a digital camera, the present invention can, of course, be applied to portable electronic appliances other than digital cameras.

What is claimed is:

1. A portable electronic appliance capable of using a battery as a power source, said appliance comprising:
   a reading device which reads information about the battery stored in a wireless tag provided on the battery by non-contact communication with the wireless tag;
   an activating device which activates the wireless tag when said non-contact communication is started;
   a recognition device which recognizes the information about the battery read by said reading device;
   a writing device which writes information in said portable electronic appliance to the wireless tag;
   a warning display device which displays a battery remaining energy warning; and
   a warning generation device which generates battery remaining energy warning information according to the information recognized by said recognition device, and sends the generated information to said warning display device.

2. The portable electronic appliance according to claim 1, wherein the information about the battery includes the kind of the battery; said recognition device recognizes at least the kind of the battery; and said warning generation device generates the battery remaining energy warning information according to the recognized kind of the battery and sends the generated information to said warning display device.

3. The portable electronic appliance according to claim 2, wherein the information about the battery further includes the name of the manufacturer of the battery; said recognition device recognizes at least the kind of the battery and the manufacturer's name; and said warning generation device generates the battery remaining energy warning information according to the recognized kind of the battery and manufacturer's name and sends the generated information to said warning display device.

4. The portable electronic appliance according to claim 2, wherein the information about the battery further includes the capacity of the battery; said recognition device recognizes at least the kind of the battery and the capacity; and said warning generation device generates the battery remaining energy warning information according to the recognized kind and capacity of the battery and sends the generated information to said warning display device.

5. The portable electronic appliance according to claim 3, wherein the information about the battery further includes the capacity of the battery; said recognition device recognizes at least the kind of the battery, the manufacturer's name and the capacity; and said warning generation device generates the battery remaining energy warning information according to the recognized kind, manufacturer's name and capacity of the battery and sends the generated information to said warning display device.

6. A portable electronic appliance capable of using a battery as a power source, said appliance comprising:
   a reading device which reads information stored in a wireless tag provided on the battery, and which is provided approximately at a center in the lengthwise direction of a lengthwise-extending place for accommodation of the battery; and
   a writing device which writes information in said portable electronic appliance to the wireless tag.

7. A portable electronic appliance capable of using a battery as a power source, said appliance comprising:
   a reading device which reads information about the battery stored in a wireless tag attached to the battery by non-contact communication with the wireless tag;
   an activating device which activates the wireless tag when said non-contact communication is started;
   a writing device which writes information in said portable electronic appliance to the wireless tag;
   a recognition device which recognizes the information about the battery read by said reading device;
   a power control device which controls the amount of power consumed by the portable electronic appliance; and
   a control command generation device which sends to said power control device a power control command according to the information recognized by said recognition device.

8. The portable electronic appliance according to claim 7, wherein the information about the battery includes the kind of the battery; said recognition device recognizes at least the kind of the battery; and said control command generation device sends to said power control device a power control command according to the recognized kind of the battery.

9. The portable electronic appliance according to claim 8, wherein the information about the battery further includes the name of the manufacturer of the battery; said recognition device recognizes the manufacturer's name of the battery; and said control command generation device sends to said power control device a power control command according to the recognized manufacturer's name of the battery.

10. A portable electronic appliance capable of using a battery as a power source, said appliance comprising:
    a reading device which reads information about the battery stored in a wireless tag attached to the battery by non-contact communication with the wireless tag;
    an activating device which activates the wireless tag when said non-contact communication is started;
    a writing device which writes information in said portable electronic appliance to the wireless tag;
    a recognition device which recognizes the information about the battery read by said reading device;
    a power control device which controls the amount of power consumed by the portable electronic appliance so that the amount of power is reduced; and
    a control command generation device which sends to said power control device a command to perform such control that the amount of power is reduced according to the information recognized by said recognition device.

11. A portable electronic appliance capable of using a battery as a power source, said appliance comprising:
    a reading device which reads information stored in a wireless tag attached to the battery by non-contact communication with the wireless tag, the stored information including information for identification of the battery and the kind of the battery;
    an activating device which activates the wireless tag when said non-contact communication is started;

a recognition device which recognizes the information read by said reading device, the read information including information for identification of the battery and the kind of the battery;

a charging device which can charge the battery in a case where the battery in said portable electronic appliance is a secondary battery;

a charging cycle storage device which stores the number of cycles of charging of the battery in said portable electronic appliance on the basis of the information for identification of the battery in a case where the battery in said portable electronic appliance is a secondary battery;

a writing device which writes information in said portable electronic appliance to the wireless tag;

a warning display device which displays a warning about use of the battery; and a warning generation device which makes said warning display device display information on a warning about use of the battery according to the number of charging cycles.

12. A portable electronic appliance capable of using a battery as a power source, said appliance comprising:

a reading device which reads information stored in a wireless tag attached to the battery by non-contact communication with the wireless tag, the stored information including information for identification of the battery and the kind of the battery;

an activating device which activates the wireless tag when said non-contact communication is started;

a recognition device which recognizes the information read by said reading device, the read information including information for identification of the battery and the kind of the battery;

a charging device which can charge the battery in a case where the battery in said portable electronic appliance is a secondary battery;

a charging cycle storage device which stores the number of cycles of charging of the battery in said portable electronic appliance on the basis of the information for identification of the battery in a case where the battery in said portable electronic appliance is a secondary battery;

a writing device which writes information in said portable electronic appliance to the wireless tag;

a power control device which controls the amount of power consumed in said portable electronic appliance so that the amount of power is reduced; and a power reduction instruction device which instructs said power control device to reduce the amount of consumed power according to the number of charging cycles.

13. A portable electronic appliance capable of using a battery as a power source, said appliance comprising:

a reading device which reads information stored in a wireless tag attached to the battery by non-contact communication with the wireless tag, the stored information including the kind of the battery and the number of cycles of charging of the battery;

an activating device which activates the wireless tag when said non-contact communication is started;

a recognition device which recognizes the information read by said reading device, the read information including the kind of the battery and the number of cycles of charging of the battery;

a charging device which can charge the battery in a case where the battery in said portable electronic appliance is a secondary battery;

a writing device which writes the number of charging cycles in said portable electronic appliance to the wireless tag;

a warning display device which displays a warning about use of the battery; and a warning generation device which makes said warning display device display information on a warning about use of the battery according to the number of charging cycles.

14. A cylindrical battery, comprising:

each of plus and minus electrodes arranged on both ends;

wireless tag attached to a center in the lengthwise direction; wherein the wireless tag records at least the information on battery types and information showing a number of battery charging cycles.

* * * * *